United States Patent [19]

Ralls

[11] Patent Number: 4,596,204

[45] Date of Patent: Jun. 24, 1986

[54] FLAG-TYPE PIG-SIG

[75] Inventor: Gene R. Ralls, Tulsa, Okla.

[73] Assignee: T. D. Williamson, Inc., Tulsa, Okla.

[21] Appl. No.: 718,349

[22] Filed: Apr. 1, 1985

Related U.S. Application Data

[63] Continuation of Ser. No. 523,118, Aug. 15, 1983, abandoned.

[51] Int. Cl.$^4$ .............................................. G09F 17/00
[52] U.S. Cl. ...................................... 116/303; 116/173
[58] Field of Search ................. 15/104.06 B; 74/567, 74/569; 116/112, 200, 275, 303, 313, 173–175; 292/140, 143

[56] References Cited

U.S. PATENT DOCUMENTS

| | | | |
|---|---|---|---|
| 884,964 | 4/1908 | Voss | 116/303 |
| 917,398 | 4/1909 | Augenbraun | 292/140 |
| 2,698,363 | 12/1954 | Rush | 15/104.06 B |
| 3,058,361 | 10/1962 | Freeborn | 74/50 |
| 3,077,359 | 2/1963 | Ettore et al. | 292/140 |
| 3,109,410 | 11/1963 | Ver Nooy | 116/303 |
| 3,848,244 | 11/1974 | Young et al. | 340/286 |
| 4,438,660 | 3/1984 | Kittle | 74/531 |

Primary Examiner—Charles Frankfort
Assistant Examiner—W. Morris Worth
Attorney, Agent, or Firm—Head, Johnson & Stevenson

[57] ABSTRACT

An apparatus for mounting on a pipeline to signal the passage of a pipeline pig through the pipeline. A tubular body is mounted on the pipeline. A flag arm is hinged to the body member and pivotal between a set and an actuated position. A plunger rod is slideably supported on the body and engages the flag arm when both are in the set position. A connecting linkage displaces the plunger rod upon the rotation of a shaft within the body and an engagement member pivotally extends from the lower end of the body into the pipeline for displacement as a pig moves through the pipeline. The engagement members serves to rotate the shaft when it is displaced to thereby withdraw the plunger rod to permit the flag arm to move to the actuated position, indicating the passage of the pipeline pig.

9 Claims, 6 Drawing Figures

4,596,204

FLAG-TYPE PIG-SIG

This is a continuation application of Ser. No. 523,118, filed Aug. 15, 1983 abandoned.

BRIEF SUMMARY OF THE INVENTION

Much of the liquid and gas utilized in the world, and particularly hydrocarbon liquids and gases, are transmitted from areas of production to areas of consumption through pipelines. To keep the interior of the pipelines clean, to separate different components, and to perform surveying functions, devices known as pipeline pigs are frequently used. Since the pipeline pigs may move at various speeds in the pipeline depending upon the velocity of fluid flow and other factors, it is sometimes difficult for the operator of a pipeline to know the location of a pipeline pig or to know when a pipeline pig has passed a certain point in a pipeline.

The present invention is directed towards an apparatus providing a signal when a pipeline pig or other object is passed through a pipeline. The apparatus is mounted on a pipeline at a point having a relatively small diameter opening in the pipeline. The apparatus includes a tubular body member which is mounted on the pipeline, such as by welding it to the pipeline. The body member encompasses the opening. A shaft is sealably secured within the body and extends partially upwardly exteriorly of the body member. A flag arm is pivotally secured to the body member exteriorally of the pipeline. The flag arm is pivoted between a set position and an actuated position; the actuated position serving to indicate the passage of a pipeline pig.

A spring is employed to urge the flag arm to the actuated position.

A plunger rod is slideably supported to the body member and is moveable relative to the body member between a set and an actuated position. One end of the plunger rod engages the flag arm to retain it in the set position. A linkage arrangement is provided to displace the plunger rod upon the rotation of the shaft.

Pivotally extending from the lower end of the tubular body member through the opening in the pipeline is a shaft actuator. By means of a beveled gear at the upper end of the shaft actuator and a mating beveled gear on the lower end of the shaft, when the actuator is displace by the passage of a pipeline pig through the pipeline the shaft is rotated. By the linkage extending from the upper end of the shaft the plunger rod is slideably retracted, releasing the flag arm to its actuated position, thus signalling the passage of a pig through the pipeline.

DESCRIPTION OF THE DRAWING

FIG. 1 shows a pipeline in cross-section, the body member of the signalling apparatus being secured to the pipeline. In FIG. 1 the device is shown in the set position.

DETAILED DESCRIPTION OF THE PREFERRED EMBODIMENT

Figure 1:
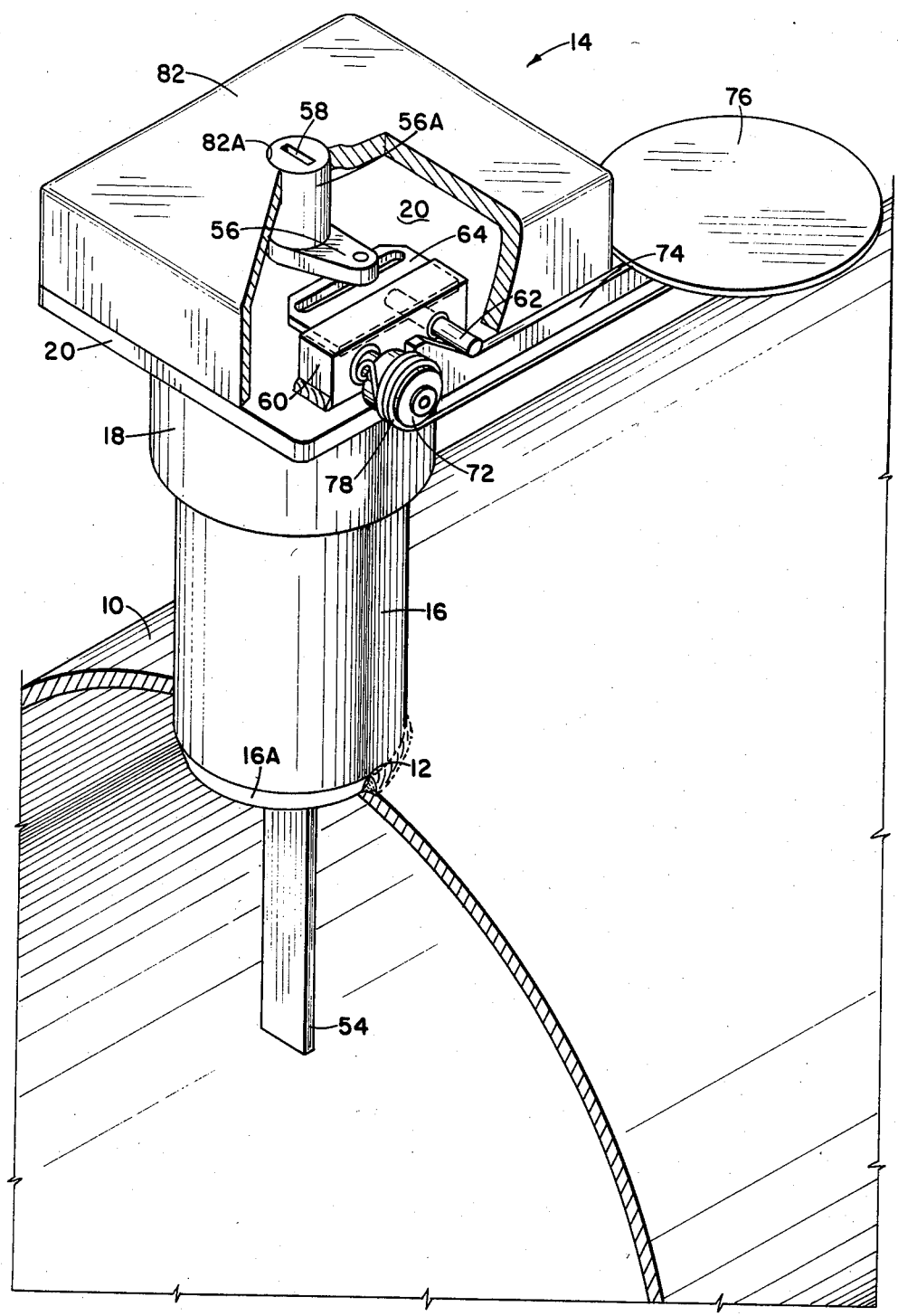
FIG. 1 is an isometric view of an embodiment of the invention shown partially cut away.

Referring now to the drawings and first to FIG. 1 an embodiment of the pig signalling device of this invention is shown. A pipeline is indicated by the numeral 10. An opening 12 is formed in the wall of the pipeline. The pipeline 10 may be of the type used for transporting liquids or gases and through which a pipeline pig or other physical object is periodically passed. The purpose of this invention is to provide a means for indicating when a pig or such physical object has passed through the pipeline.

The pig signalling device is indicated generally by the numeral 14. The device includes a tubular housing 16, the lower end 16A of which is welded to the pipeline 10 to encompass opening 12.

Figure 3:
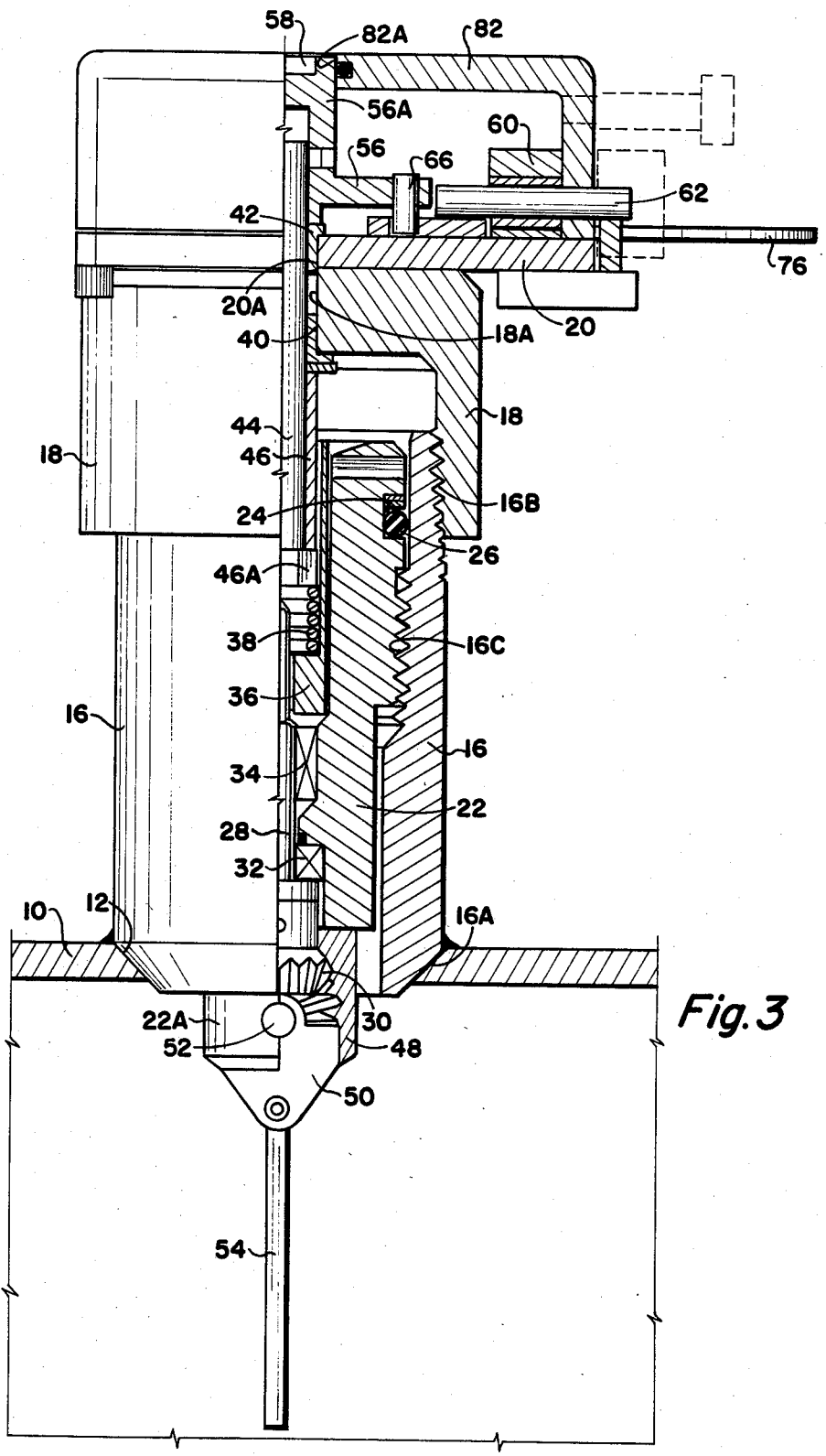
FIG. 3 is an elevational view, shown partially in cross-section of the apparatus.

As shown in FIG. 3 the upper end of the tubular housing is threaded at 16B and receives an internally threaded housing cap member 18 which has, an opening 18A. Secured to the upper end of the housing cap member 18 is a horizontal plate 20 with an opening 20A therein in alignment with opening 18A.

The tubular housing 16 is provided with internal threads 16C which receives a tubular shaft retainer 22. As previously stated, housing 16 is designed to be welded to pipe 10. Since welding can cause distortion of the housing, the device is constructed so that all of the other elements of the pig signalling apparatus are independently and separately secured to the housing after it is welded in position.

The tubular shaft retainer 22 has a groove 24 in the upper end receiving an 0-ring gasket 26 so that the interior of the tubular housing 16 is sealed.

Rotatably received within tubular shaft retainer 22 is a lower shaft 28. Secured to the lower end of the shaft 28 is a beveled gear 30. The lower shaft 28 is supported by bearings 32 and 34.

Rotatably received in the upper interior of the tubular shaft retainer 22 is a sleeve 36. The lower end of sleeve 36 has a square cross-sectioned opening which telescopically receives the square upper end of lower shaft 28. The upper interior portion of sleeve 36 has a hexagonal interior configuration.

Positioned within the opening 18A in the cap member 18 and the opening 20A of plate 20 are bushings 40 and 42. Received in these bushings is an upper shaft 44. The lower end portion of the upper shaft receives a spacer sleeve 46. The lower end of shaft 44 is provided with an enlarged portion 46A having a hexagonal configuration which is telescopically received within the hexagonal upper recess in sleeve 36. Thus the upper shaft 44 is rotatably locked to lower shaft 28 by means of sleeve 36. Positioned with sleeve 36 is a spring 38 which provides tension to the shaft 44.

It can be seen that the apparatus can be assembled in this way. First, the tubular housing 16 is welded to pipe 10. Second, the tubular shaft retainer 22 is screwed into position which rotatably supports lower shaft 28, sleeve 36 and spring 38. Next, the cap member 18 is threaded onto the tubular housing 16 causing upper shaft 44 to be coupled to the lower shaft 28 by the engagement of slot 46A of the sleeve with one end of spring 38.

The tubular shaft retainer 22 has a reduced diameter downwardly extending integral portion 22A having a slot 48 therein. Slot 48 is in a plane parallel the plane of the drawing of FIG. 3. Received in slot 48 is a beveled drive gear member 50 which is rotated about shaft 52. Drive gear 50 engages beveled gear 30. Attached to and downwardly extending from the beveled drive gear member 50 is an elongated engagement member 54. When a pig or other physical object passes through the interior of pipeline 10 it contacts the engagement member 54, moving the beveled drive gear member 50 about axis 52. This rotates the lower shaft 28 and by means of sleeve 36, the upper shaft 44.

Figure 2:
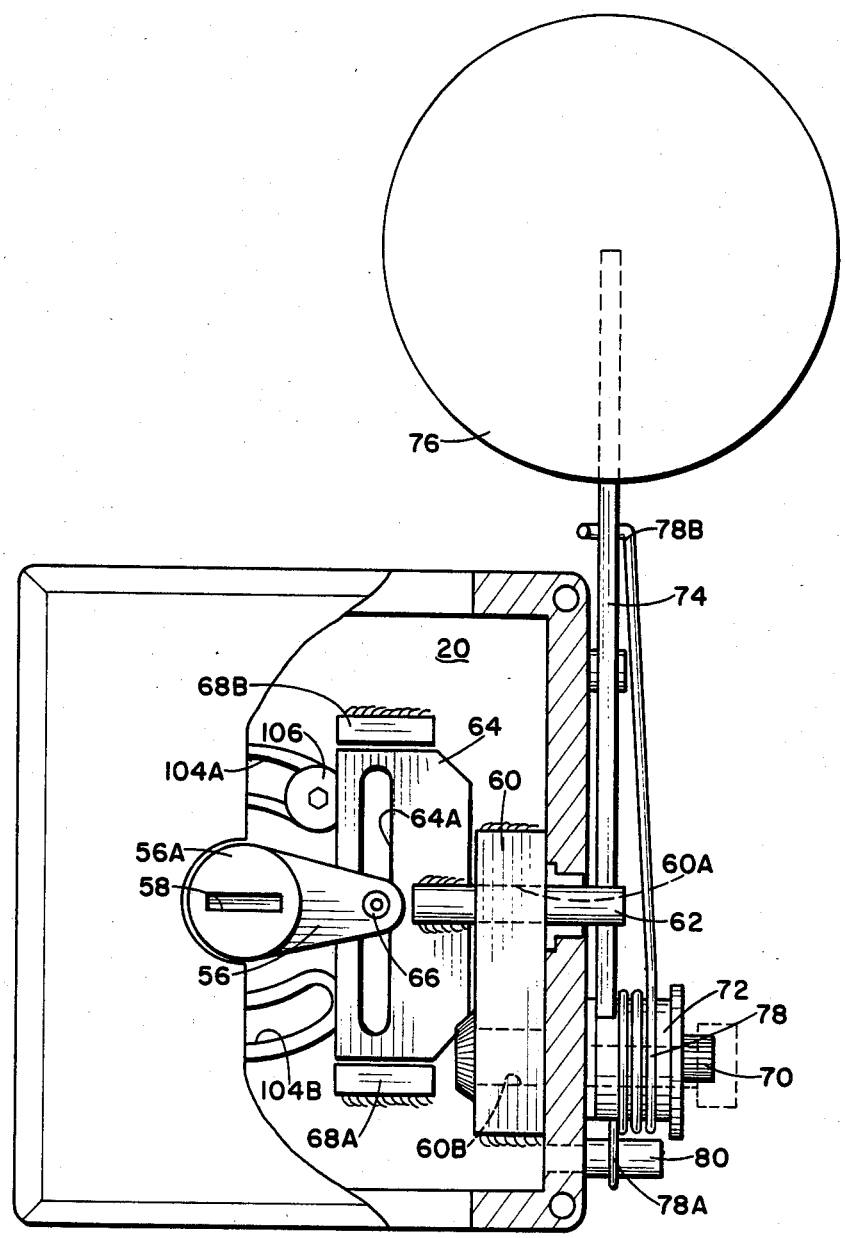
FIG. 2 is a top view of the apparatus for signalling the passage of a pipeline pig, shown partially cut away to reveal the interior arrangement.

Affixed to the upper end of shaft 44 is a cam arm 56. In the illustrated arrangement the cam arm 56 includes an integral upwardly extending tubular portion 56A which is closed at the upper end and is provided with a slot 58. This is best seen in FIGS. 1 and 2 in conjunction with FIG. 3.

Secured to the upper surface of plate 20 is a bearing block 60. The bearing block has first and second horizontal openings 60A and 60B therethrough. Slideably received in openings 60A is a plunger rod 62. The inner end of the plunger rod is secured to an actuator plate 64 which has a longitudinal slot 64A therein, the length of the slot being perpendicular the longitudinal axis of the plunger rod 62. At the outer end of cam arm 56 is a perpendicular extending pin 66 which is received in the slot 64.

Secured to the top of plate 20 to either end of the actuator plate 64 are guide blocks 68A and 68B. When upper shaft 44 is rotated, thereby rotating the cam arm 56 the actuator plate and plunger rod 62 are slideably rearwardly withdrawn. This occurs regardless of the direction of the rotation of the upper shaft 44.

Figure 4:
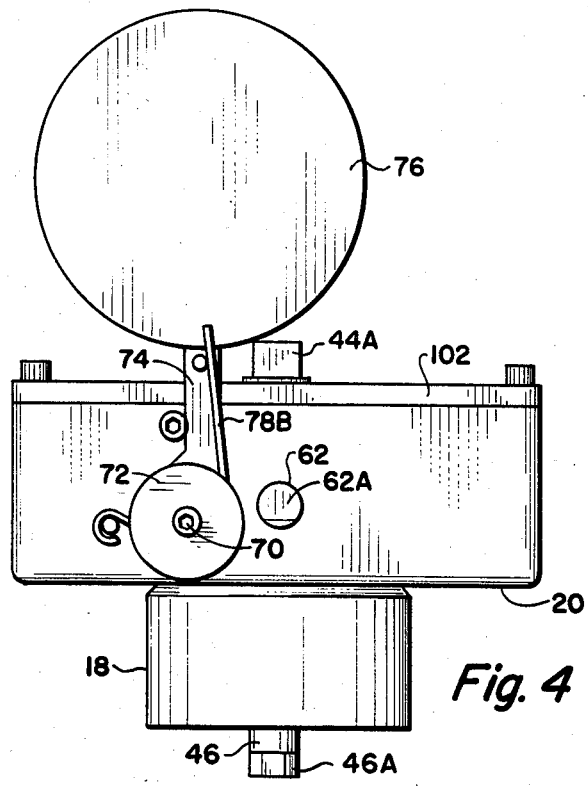
FIG. 4 is an elevational view of the device shown in the actuated position with the tubular body portion not being shown.

Rotatably received in opening 60B in the bearing block is a flag arm shaft 70. Rotatably received on the shaft 70 is a sheave 72 and extending from this sheave is a flag arm 74 having a flag member 76 affixed at the outer end. Received about the sheave 72 is a coiled spring 78. One end of 78A of the spring engages a pin 80 while the other end 78B engages the flag arm 74. The spring is configured to apply a counter clockwise torque to the flag arm as viewed from FIG. 1 to normally cause the flag arm and the flag member to extend in an upright position, as shown in FIG. 4. This is the actuated position. FIGS. 1 and 2 shows the flag arm in a set position in which it is held in place by the extending plunger rod 62.

A cover 82 is secured to the upper end of plate 20 to protect the operating mechanism. The cover 82 has an opening 82A which rotatably receives the tubular extension 56A of the cam arm so as to expose to view the slot 58. In addition, the cover has openings for receiving the plunger rod 62 and flag arm shaft 70.

When it is desired to put the pig signaling device in the set position the operator can retract the plunger rod 62 by inserting a screw driver into slot 58 in the upper end of the cam arm. By rotating the cam arm the actuator plate and plunger rod are withdrawn. The flag arm 74 may be rotated downwardly to the set position and the torque on the cam arm released, allowing the plunger pin to extend outwardly to hold the flag arm in the set position. When a pig or any physical object passes through the pipeline, in either direction, it contacts the engagement member 54, displacing it, causing rotation of the lower shaft 28 and thereby the upper shaft 44, rotating the cam arm and thereby the actuator plate, retracting the plunger rod 62. Spring 78 then moves the flag arm into the upright position indicating that the pig has passed through the pipeline. The flag arm stays in this upright, actuated position, until reset by an operator. The downwardly extending engagement member 54 is freely pivotal in any direction by a pig passing through the line and does not interfere with the passage of the pig whether the signaling device is in the set or the actuated position.

Figure 5:
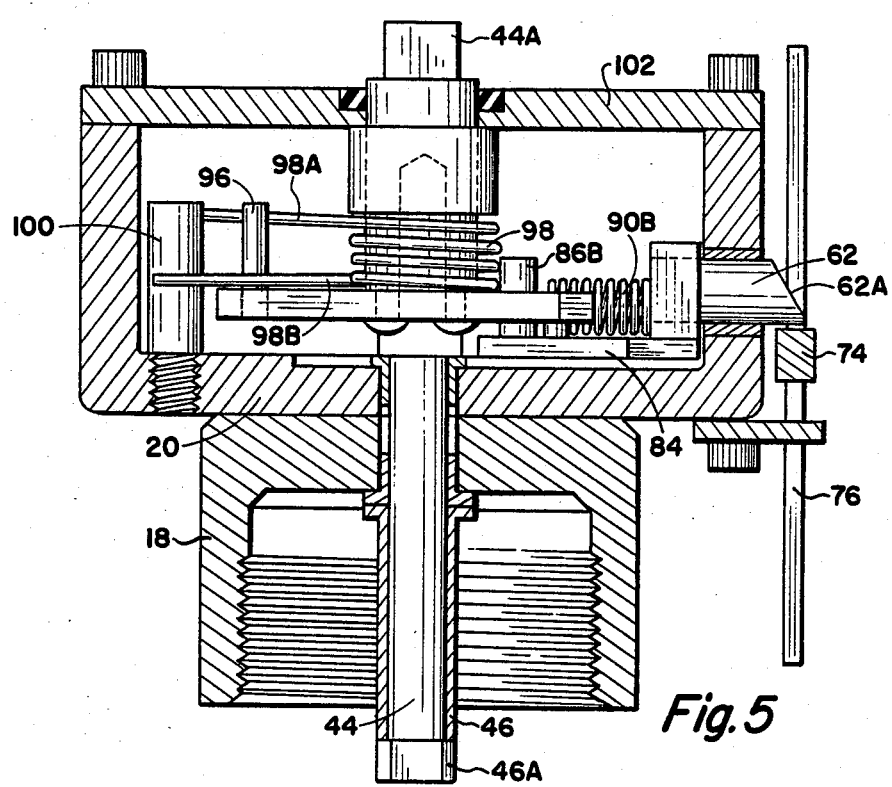
FIG. 5 is a cross-sectional view of the upper portion of the pig signalling device.
Figure 6:
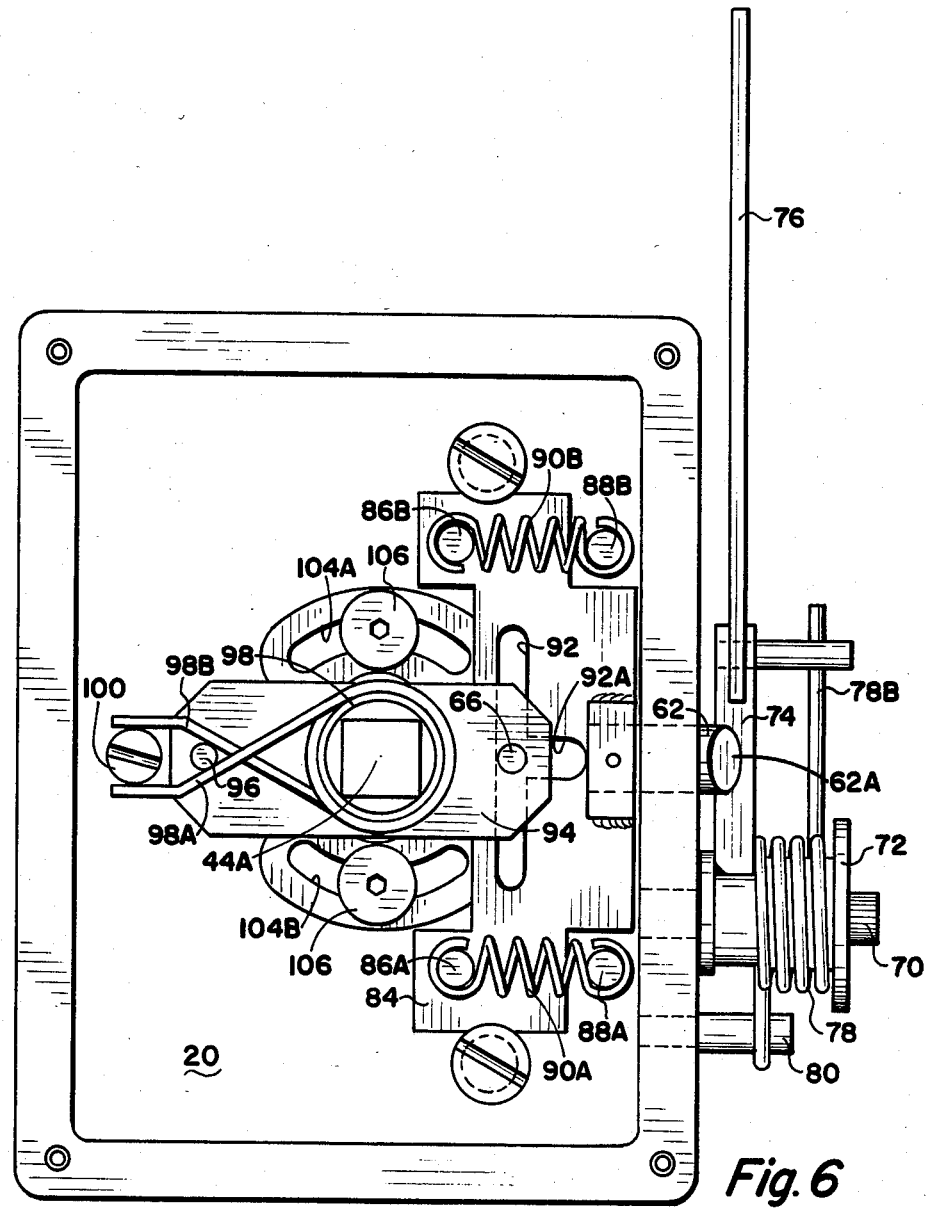
FIG. 6 is a top view as shown in FIG. 2, somewhat enlarged, and showing an alternate embodiment of the invention.

FIGS. 4, 5 and 6 show an alternate embodiment. The lower portion is not shown since it may be substantially as indicated with reference to the embodiments of FIGS. 1, 2 and 3.

As seen best in FIG. 6, the actuator plate 84 has two spaced apart pins 86A and 86B. These are opposed by pins 88A and 88B extending upwardly from plate 20. Springs 90A and 90B extending between the pairs of pins and urge the actuator plate 84 in the direction towards the flag arm 74. The slot 92 formed in actuator plate 84 has a perpendicularly extending portion 92A. This permits the actuator plate 84 to be inwardly depressed without movement of the upper shaft 44. As seen best in FIG. 5, the outer end 62A of the plunger rod 62 is at an angle with respect to the longitudinal axis of the plunger rod. This permits the signaling device to be moved to the set position without requiring that the plunger be withdrawn since the downward movement of the actuator arm 74 will cause the plunger rod and thereby the actuator plate to be inwardly depressed, the slot 92A receiving pin 66.

In the alternate embodiment the cam arm 94 extends in both directions from the upper shaft 44. Opposite the pin 66 is a second pin 96. Formed around the upwardly extending end portion 44A of the upper shaft is a coiled spring 98 having opposed arms 98A and 98B, the arms extending to either side of pin 66. A cam stop pin 100 is secured to upper plate 20. Spring 98 thereby serves to retain the upper shaft 44A in the central or non-actuated position. Thus as the shaft 44 is rotated in either direction it biased to return to the preselected rotational position as established by spring 98. This thereby keeps the engagement member 54, as shown in FIGS. 1 and 3 in the downwardly extending position while nevertheless, allowing the engagement member to be displaced in either direction by a pig passing through the pipeline.

The operation of the embodiment of FIGS. 1 to 3 and that of FIGS. 4 to 6 is essentially the same. The embodiments illustrate the fact that retaining the actuator plate and the engagement member in the preselected set positions can be achieved utilizing springs placed in more than one location.

In the embodiment of FIGS. 4, 5 and 6 the housing covering the upper operating mechanism is formed integrally with the plate 20 with a removeable top cover 102 showing that the housing also may be formed in a variety of ways.

In both embodiments of the invention the plate 20 has arcuate slots 104A and 104B, the axis of curvature of the slots being that of the upper shaft 44. Bolts 106 in the slots extend into threaded openings (not shown) in the upper end of cap member 18. When the bolts 106 are loosened the plate 20 may be rotated relative to the cap member to thereby align the operating mechanism supported by the plate with the upper shaft 44. This permits easy adjustment of the mechanism after it is assembled so that when the engagement member 54 is extending vertically downward the pin 66 is centered within slot 64A in the actuator plate 64 or, with reference to the alternate embodiment, slot 92 in the actuator plate 84.

While the invention has been described with a certain degree of particularity it is manifest that many changes may be made to details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for mounting on a pipeline to signal the passage of a pipeline pig or similar physical apparatus through the pipeline, which apparatus is not dependent on the availability of electrical energy, the pipeline having an opening therein, comprising:
   a tubular body member for mounting on the pipeline encompassing the opening therein.
   a vertical shaft extending sealably within and partially exteriorally of said body member;
   a flag arm pivotally secured to said body member and pivotal about a horizontal axis between a set and an actuated position;
   means to urge said flag arm to the actuated position;
   an actuator plate slidably supported to said body member in a plane perpendicular to the rotational axis of said shaft, the actuator plate being slideable between a set and an actuated position, said actuator plate having an elongated slot therein;
   a cam arm extending radially of said shaft; and
   a pin means extending from said cam arm and received in said actuator plate slot, whereby the rotation of said cam arm displaces said actuator plate by the engagement of said pin means in said actuator slot;
   a plunger rod slideably affixed to said actuator plate and being slideable relative to said tubular body member between a set and an actuated position, said plunger rod engaging said flag arm when both are in the set position to retain said flag arm in the set position;
   shaft actuator means extending from said body member into the pipeline to cause the rotation of said shaft when engaged by a pipeline pig or the like passing through the pipeline, to thereby slideably displace said plunger rod to the actuated position, releasing said flag arm to pivot to the actuated position signaling the passage of a pipeline pig or the like.

2. An apparatus according to claim 1 wherein said means to urge said flag arm to the actuated position includes spring means.

3. An apparatus according to claim 1 including:
   a beveled shaft gear affixed coaxially to said shaft;
   a beveled drive gear rotatably supported to said body about an axis perpendicular said shaft rotational axis and engaging said shaft gear; and
   an elongated engagement member affixed to said drive gear and extending within the pipeline whereby a pipeline pig or the like passing through the pipeline displaces said engagement member, rotating said drive gear and thereby said shaft to displace said plunger rod to release said flag arm to the actuated position.

4. An apparatus according to claim 3 including:
   a spring means received about said shaft to urge said shaft to the position in which said actuator member is extending generally radially into the pipeline and said plunger rod is in the set position.

5. An apparatus according to claim 1 including:
   spring means urging said actuator plate and thereby said plunger rod towards the set position.

6. An apparatus according to claim 1 wherein said plunger rod is tapered on one side at its end opposite said actuator plate whereby said flag arm may be rotated from the actuated to the set position, the flag arm engaging said tapered end to inwardly displace said plunger rod and actuator plate as said flag arm passes to move to the set position.

7. An apparatus according to claim 1 including:
   a coiled spring received about said shaft and having the ends of the spring secured in relationship to said body member and said cam arm to automatically return said shaft and cam arm to the set position except when shaft is rotated by the presence of a pipeline pig or the like.

8. An apparatus according to claim 7 wherein said spring has two arms extending from a coiled portion received about said shaft, and wherein said cam arm has a pin extending therefrom parallel to and spaced from said shaft, said spring arms extending to either side of said pin, and a cam stop pin secured to said body member parallel to and spaced from said shaft and cam pin, said spring arm extending to either side of said cam stop pin.

9. An apparatus according to claim 1 wherein said slot in said actuator plate provides an actuator surface engaged by said cam arm pin means as said actuator plate is displaced by the rotation of said cam arm, and said slot being configured to permit the inward displacement of said actuator plate to permit said flag arm to be moved from the actuated to the set position.

* * * * *